(12) United States Patent
Ennis et al.

(10) Patent No.: US 6,477,022 B1
(45) Date of Patent: Nov. 5, 2002

(54) GROUND FAULT OF ARC FAULT CIRCUIT BREAKER EMPLOYING FIRST AND SECOND SEPARABLE CONTACTS AND PLURAL ACTUATING MECHANISMS

(75) Inventors: Ralph M. Ennis, Imperial, PA (US); James R. Farley, Pittsburgh, PA (US); Rufus L. Barnes, Cranberry Township, PA (US); John A. Wafer, Moon Township, PA (US)

(73) Assignee: Eaton Corporation, Cleveland, OH (US)

( * ) Notice: Subject to any disclaimer, the term of this patent is extended or adjusted under 35 U.S.C. 154(b) by 315 days.

(21) Appl. No.: 09/614,571

(22) Filed: Jul. 12, 2000

(51) Int. Cl.[7] .......................... H02H 3/00; H01H 73/00
(52) U.S. Cl. ........................................ 361/42; 335/18
(58) Field of Search ........................... 361/42, 43, 48, 361/91.3, 93.1, 115; 335/17, 18

(56) References Cited

U.S. PATENT DOCUMENTS

| 3,081,386 A | 3/1963 | Koenig et al. |
| 4,549,153 A | 10/1985 | Forsell et al. |
| 4,616,206 A | 10/1986 | Bridges et al. |
| 4,929,919 A | 5/1990 | Link et al. |
| 5,224,006 A | 6/1993 | Mackenzie et al. |
| 5,260,676 A | 11/1993 | Patel et al. |
| 5,293,522 A | 3/1994 | Fello et al. |
| 5,301,083 A | 4/1994 | Grass et al. |
| 5,691,869 A | 11/1997 | Engel et al. |
| 5,982,593 A | * 11/1999 | Kimblin et al. ............... 361/42 |
| 6,014,297 A | * 1/2000 | Clarey et al. ................. 361/42 |
| 6,285,534 B1 | * 9/2001 | Gibson et al. ................ 361/42 |
| 6,392,513 B1 | * 5/2002 | Whipple et al. .............. 335/18 |

* cited by examiner

Primary Examiner—Adolf Deneke Berhane
(74) Attorney, Agent, or Firm—Martin J. Moran

(57) ABSTRACT

A miniature circuit breaker incorporating ground fault protection and arc fault protection includes main separable contacts. An operating mechanism actuated by a trip mechanism opens the main separable contacts in response to predetermined current conditions. Auxiliary separable contacts are disposed in series with the main separable contacts. A solenoid having a movable plunger opens and closes the auxiliary separable contacts in response to a remote external signal. A ground fault trip circuit detects a ground fault, and an arc fault trip circuit detects an arc fault. An actuator mechanism, energizable by the ground fault trip circuit and the arc fault trip circuit, actuates the plunger to open the auxiliary separable contacts.

17 Claims, 3 Drawing Sheets

GROUND FAULT OF ARC FAULT CIRCUIT BREAKER EMPLOYING FIRST AND SECOND SEPARABLE CONTACTS AND PLURAL ACTUATING MECHANISMS

BACKGROUND OF THE INVENTION

1. Field of the Invention

This invention relates to circuit breakers and, more particularly, to remotely controlled circuit breakers having one or both of ground fault and arc fault trip mechanisms.

2. Background Information

Circuit breakers are generally old and well known in the art. Examples of circuit breakers are disclosed in U.S. Pat. Nos. 5,260,676; and 5,293,522. Circuit breakers are used to protect electrical circuitry from damage due to an overcurrent condition, such as an overload condition or a relatively high level short circuit or fault condition.

In small circuit breakers, commonly referred to as miniature circuit breakers, used for residential and light commercial applications, circuit protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. In one circuit breaker, for example, the thermal characteristic responds to 30 A being drawn in a 15 A circuit. On the other hand, an armature, which is attracted by the sizable magnetic forces generated in a magnetic core by a short circuit or fault, also unlatches, or trips, the operating mechanism. As an example, the magnetic type actuation occurs when the hot line conductor becomes directly connected with ground or neutral, thereby bypassing the load.

It is known to provide a remotely controlled circuit breaker wherein the separable contacts are tripped to an open condition by an actuator responding to a control signal.

It is further known to provide a remotely controlled circuit breaker having main separable contacts and also having auxiliary or switching relay separable contacts which are opened by an actuator responding to a control signal. This enables the circuit breaker to additionally perform a switching function and manage a load connected to the breaker, such that the breaker performs the dual functions of overload current protection and load management.

In many applications, a miniature circuit breaker may provide ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device.

A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line-to-ground fault causes the magnitude of the amplified signal to exceed the magnitude of the reference values and, thus, generates a trip signal. At least the neutral conductor of the protected circuit passes through the second sensor coil. A neutral-to-ground fault couples the two detector coils which causes the amplifier to oscillate, thereby resulting in the generation of the trip signal. See, for example, U.S. Pat. Nos. 5,260,676; and 5,293,522.

Recently, there has been considerable interest in also providing protection against arc faults. Arc faults are intermittent high impedance faults which can be caused, for instance, by worn insulation between adjacent conductors, by exposed ends between broken conductors, by faulty connections, and in other situations where conducting elements are in close proximity. Because of their intermittent and high impedance nature, arc faults do not generate currents of either sufficient instantaneous magnitude or sufficient average RMS current to trip the conventional circuit breaker. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for generating an arc fault trip signal to respond to arc faults. See, for example, U.S. Pat. Nos. 5,224,006; and 5,691,869. The arc fault trip signal energizes a shunt trip solenoid, which unlatches the operating mechanism, typically through actuation of the thermal-magnetic trip device.

Although the prior art shows a wide range of circuit breakers, there is room for improvement.

SUMMARY OF THE INVENTION

The invention is directed to a circuit breaker including first separable contacts, second separable contacts in series with the first separable contacts, and one or both of means for detecting a ground fault and means for detecting an arc fault. An actuator means is energizable by one or both of the means for detecting a ground fault and the means for detecting an arc fault. Absent arc fault and ground fault conditions, the first separable contacts are normally opened in response to predetermined current conditions, while the second separable contacts are normally opened in response to a signal. Otherwise, an actuator means is energizable by one or both of the means for detecting a ground fault and the means for detecting an arc fault to open the second separable contacts.

A circuit breaker in accordance with the invention includes first separable contacts, and means for opening the first separable contacts in response to predetermined current conditions. The circuit breaker further includes second separable contacts in series with the first separable contacts, and means for operating the second separable contacts in response to a signal. The circuit breaker also includes at least one of: (a) means for detecting a ground fault, and (b) means for detecting an arc fault. An actuator means, energizable by such at least one of the means for detecting a ground fault and the means for detecting an arc fault, actuates the means for operating the second separable contacts to open the second separable contacts. In this manner, following a ground fault or an arc fault, a signal, such as a remote external signal, may be employed to reset the circuit breaker after a ground fault or arc fault without requiring local manual intervention.

Preferably, the actuator means is a solenoid means for actuating the means for operating the second separable contacts.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a single pole miniature circuit breaker of the type commonly used in residential and light commercial applications. Residential and commercial lighting and appliance branch circuit breakers of the narrow width type are known, for example, as shown in U.S. Pat. Nos. 3,081,386, 4,549,153, 4,616,206, 4,929,919, and 5,301,083, which are incorporated herein by reference. Such circuit breakers provide overload current protection. However, it will be evident to those skilled in the art that the invention is also applicable to other types of circuit breakers as well.

Figure 1:
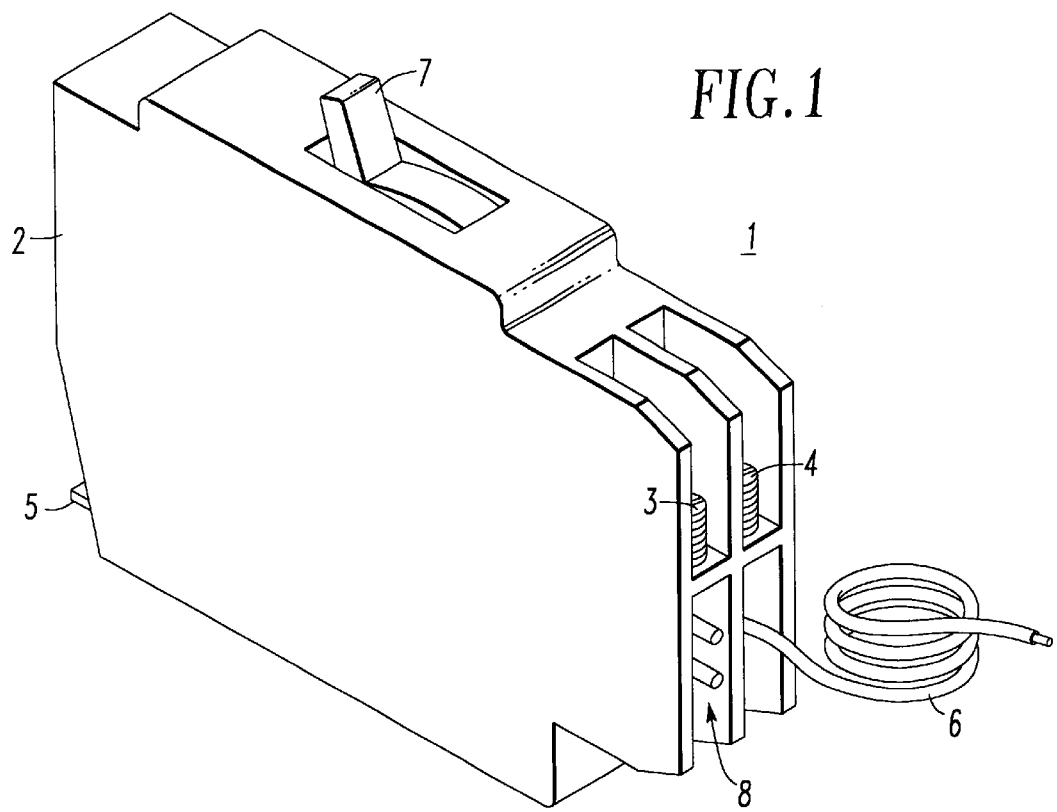
FIG. 1 is an isometric view of a circuit breaker in accordance with the invention.

Referring to FIG. 1, the exemplary single pole miniature circuit breaker 1 includes a housing 2, which is assembled from a number of molded sections composed of an electrically insulating material, as is well known. Terminals 3 (load) and 4 (load neutral) are provided at one end of the housing 2 for connecting the circuit breaker 1 to a load (not shown). A stab 5 (line) and a pigtail 6 (line neutral) connect the circuit breaker 1 to a commercial power distribution system (not shown). A molded handle 7 projects from the housing 2 for manually opening and closing the circuit breaker 1. A pair of terminals 8 input a remote external signal, which is employed to open and close auxiliary contacts 10 (shown in FIG. 4). The exemplary remote control residential and commercial lighting and appliance branch circuit breaker 1 provides overload current protection and, also, provides load management.

Figure 2:
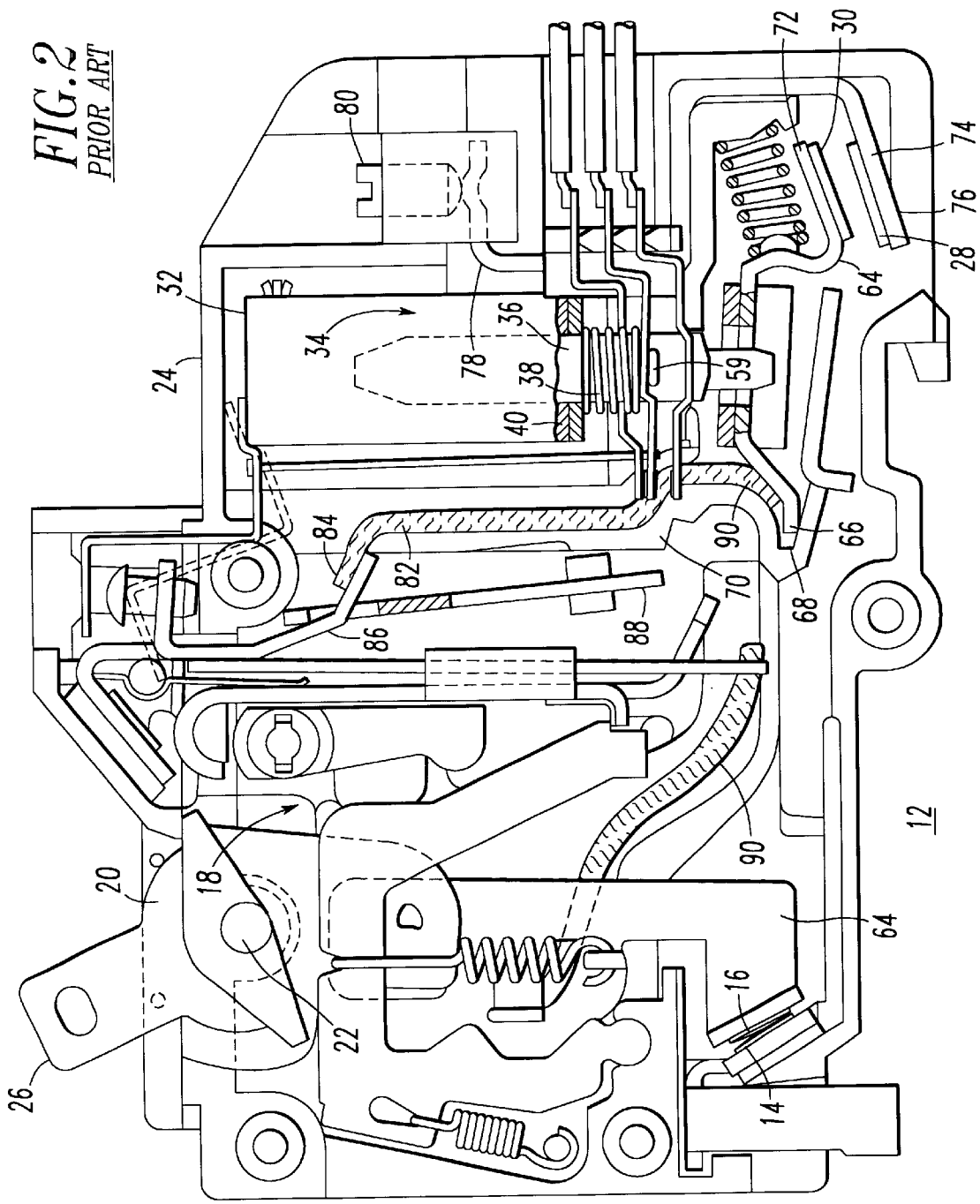
FIG. 2 is a side elevation view of a circuit breaker structure, but with the front cover removed.

FIG. 2 shows a circuit breaker structure 12, which also provides overload current protection and load management. A first set of separable overload breaker main contacts 14,16 and a trip structure 18 cause separation of the main contacts 14,16 in response to overload currents therethrough. A molded insulating operator 20 is rotatably journaled on cylindrical bosses, one of which is shown at 22, received in recesses formed in base 24 and cover (not shown). Operating handle 26 of the operator 20 extends upwardly through an opening in the case for external manual operation of the circuit breaker 12. Another pair of switching relay auxiliary contacts 28,30, and an actuator 32 energizable to mechanically actuate the auxiliary contacts 28,30 between a normally closed condition (as shown in FIG. 3), and an open condition (FIG. 2).

Figure 3:
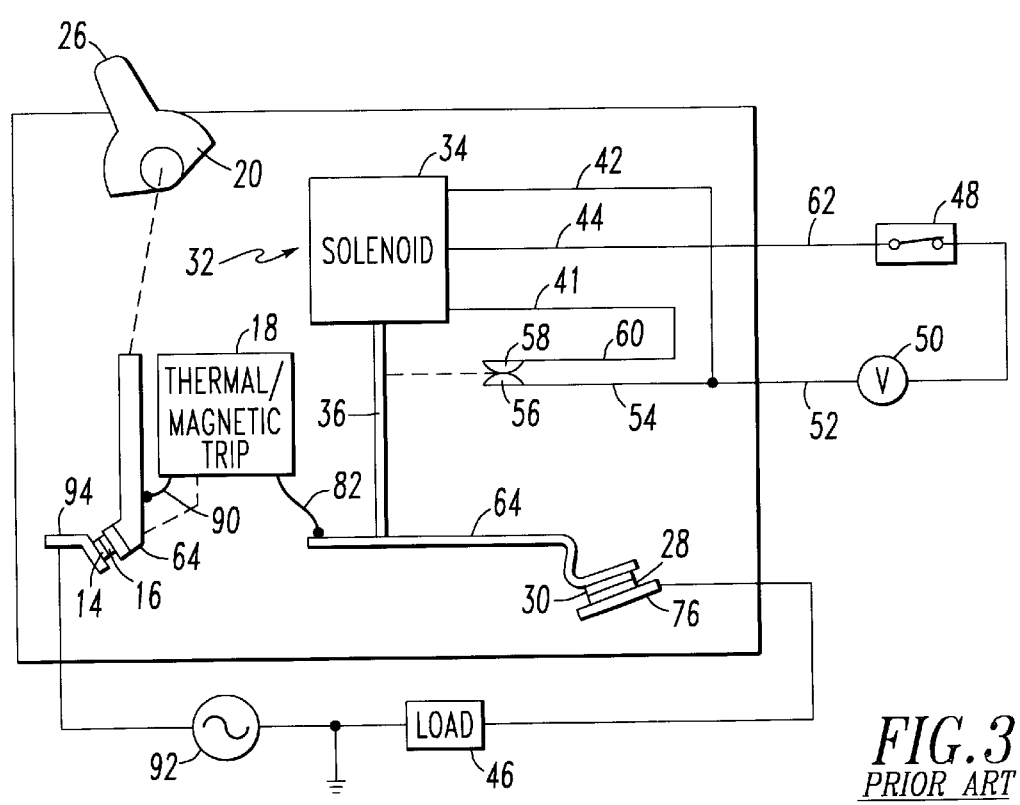
FIG. 3 is a schematic circuit diagram for the solenoid of the circuit breaker of FIG. 2.

Referring to FIG. 3, the actuator 32 includes a solenoid 34 having a movable plunger with an upper metal section 36 actuated by the solenoid 34 to move along an axial travel path between an upper position (as shown in FIG. 2) and a lower position (FIG. 3), respectively. In the upper position of the plunger, auxiliary contacts 28,30 are open (as shown in FIG. 2). In the lower position of the plunger, auxiliary contacts 28,30 are closed. The plunger includes a lower section of plastic or other insulating material press fit affixed to the upper section 36 at serrations (not shown). A spring 38 (shown in FIG. 2) bears between lower frame plate 40 of the solenoid and the lower plunger section to bias the plunger axially downwardly.

The solenoid 34 includes a pickup coil energized by control signal current on conductor 41, and a holding coil energized by control signal current on conductor 42. Conductor 44 provides a common return. When the auxiliary contacts 28,30 are closed, the solenoid plunger is in its downward position (FIG. 3). When it is desired to shed load 46, remote switch 48 is closed, which completes a circuit from voltage source 50 through conductor 52, terminal 54, contacts 56,58, terminal 60 and conductor 41 to the pickup coil of solenoid 34, which circuit is returned through conductor 44, conductor 62 and closed switch 48 to source 50. A circuit is also completed from voltage source 50 through conductor 52, and terminal 42 to energize the holding coil of solenoid 34. Energization of the pickup coil and holding coil of the solenoid 34 causes upward retraction of the solenoid plunger to the position shown in FIG. 2, to open auxiliary contacts 28,30, and, hence, stop current flow to load 46.

During upward movement of the plunger, a trunnion 59 (shown in FIG. 2) engages the underside of terminal 60 to move contact 58 upwardly out of engagement with contact 56, to break the circuit to the solenoid pickup coil. Only the holding coil is necessary to hold the plunger in its upward position. The bias of spring 38 (shown in FIG. 2) is small and easily overcome.

Referring again to FIG. 2, the contact 30 is a movable contact mounted on a movable contact arm 64 having a left end pivot point 66 pivotally mounted in the case at a bearing recess 68 at the bottom of dividing wall 70. Movable contact 30 is soldered, welded, brazed or the like to the right end of contact arm 64 at a contact engagement point 72. Contact 28 is a stationary contact mounted by soldering, welding, brazing or the like to the lower portion 74 of a stationary terminal 76, with an upper portion 78 for connection at tightening screw 80 to the load side conductor (not shown) of a branch circuit.

Auxiliary contacts 28,30 are electrically connected in series with the main contacts 14,16. A flexible braided pigtail conductor 82 has an upper end 84 affixed by soldering, welding, brazing or the like to support conductor 86 at the upper end of bimetal member 88. Pigtail conductor 82 extends rightwardly through a passage (not shown) in the upper portion of dividing wall 70 and then axially vertically downwardly along the right side of dividing wall 70, between dividing wall 70 and actuator 32. The lower end 90 of pigtail conductor 82 is affixed by soldering, welding, brazing or the like to the movable contact arm 64 adjacent left end pivot point 66. The electric circuit current path (as shown in FIG. 3), is from the power source 92 to stationary terminal 94 to main contacts 14,16 to movable contact arm 64 to pigtail conductor 90 to trip structure 18 (including bimetal member 88 and support conductor 86 of FIG. 2) to pigtail conductor 82 to movable contact arm 64 to auxiliary contacts 28,30 to stationary terminal 76 and to the branch circuit load 46.

Figure 4:
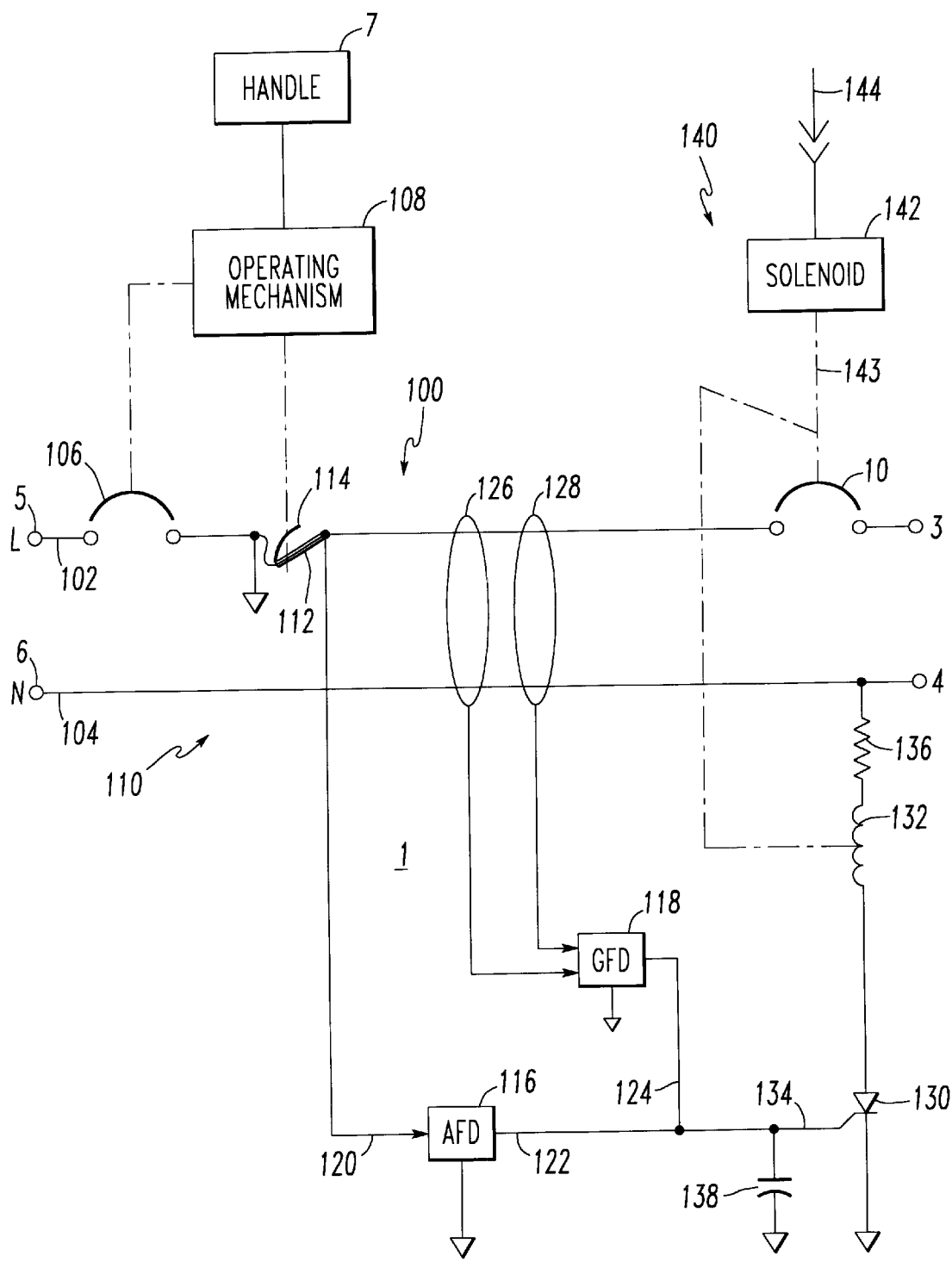
FIG. 4 is a schematic diagram of the circuit breaker of FIG. 1 in which the second separable contacts are remotely controlled, and the ground fault detector and/or the arc fault detector energize the trip solenoid to open the second separable contacts.

Referring now to FIG. 4, the circuit breaker 1 of FIG. 1 is connected in an electric power system 100, which has a line conductor 102 and a neutral conductor 104. The circuit breaker 1 includes main separable (thermal/magnetic) contacts 106, which are mounted in the housing 2 of FIG. 1 and connected in the line conductor 102. The separable contacts 106 are opened and closed by an operating mechanism 108. In addition to being operated manually by the handle 7, the operating mechanism 108 can also be actuated to open the separable contacts 106 by a trip assembly 110 in response to predetermined current conditions. The trip assembly 110 includes the conventional bimetal 112, which is heated by persistent overcurrents and bends to actuate the operating mechanism 108 to open the separable contacts 106. An armature 114 in the trip assembly 110 is attracted by the large magnetic force generated by very high overcurrents to also actuate the operating mechanism 108 and provide an instantaneous trip function. The operating mechanism 108 and trip assembly 110 cooperate to open the main separable contacts 106 in response to predetermined current conditions, with the operating mechanism 108 opening the contacts 106 when actuated, and the trip assembly 110 actuating the operating mechanism 108 in response to predetermined current conditions.

The circuit breaker 1 is also provided with an arc fault detector (AFD) 116 and a ground fault detector (GFD) 118. The AFD 116 may be, for instance, of the type which detects the step increases in current which occur each time an arc is struck, although other types of arc fault detectors could also be used. Suitable arc fault detectors are disclosed, for instance, in U.S. Pat. No. 5,224,006, with a preferred type described in U.S. Pat. No. 5,691,869, which is hereby incorporated by reference. The AFD 116 senses the current in the electrical system 100 by monitoring the voltage across the bimetal 112 through the lead 120 to sense an arc fault current condition.

As described in U.S. Pat. No. 5,691,869, the AFD 116 includes circuitry, which generates a pulse in response to each step change in current. The pulse signal is integrated with the result of the integration being attenuated over time. When the time attenuated accumulation of the pulses reaches a selected level, the AFD 116 generates at its output an arc fault trip signal 122 which is active in response to the arc fault. In turn, the signal 122 is combined with the output signal 124 of the GFD 118. The GFD 118 may be of the well known dormant oscillator type in which case it utilizes a pair of sensing coils 126,128 to detect both line-to-ground and neutral-to-ground fault current conditions.

If the AFD 116 detects an arc fault in the electric power system 100, the trip signal 122 is generated which turns on a switch such as the silicon controlled rectifier (SCR) 130 to energize a trip solenoid actuator 132. When the GFD 118 detects a ground fault, it generates at its output the ground fault trip signal 124 which is active in response to the ground fault. The ground fault trip signal 124 is "ORed" with the arc fault trip signal 122 (i.e., an "OR" function of the outputs of the GFD 118 and the AFD 116), such that the combination of the signals 122,124 forms a fault protection trip signal 134.

The trip signal 134 turns the SCR 130 on, energizes the trip solenoid actuator 132 to open the separable contacts 10 in response to the arc fault or ground fault. A resistor 136 in series with the coil of the trip solenoid actuator 132 limits the coil current and a capacitor 138 protects the gate of the SCR 130 from voltage spikes and false tripping due to noise. In this manner, either the arc fault condition or the ground fault condition results in the interruption of electrical power independent of the other. Although both the AFD 116 and GFD 118 are shown, it will be appreciated that the invention is applicable to circuit breakers having only one of the AFD 116 and GFD 118 trip circuits.

Continuing to refer to FIG. 4, the auxiliary separable contacts 10 are in series with the main separable contacts 106. An actuator 140 includes a solenoid 142 having a movable plunger 143 to operate the auxiliary contacts 10, such that in the upper position (with respect to FIG. 4) of the plunger 143, auxiliary contacts 10 are open, and in the lower position (with respect to FIG. 4) of the plunger 143, auxiliary contacts 10 are closed. The solenoid 142 is energized by a remote external control signal 144 to cause upward retraction of the solenoid plunger 143 to, thereby, open auxiliary contacts 10 in response to the signal 144 and, hence, stop current flow to the load (not shown) at terminals 3,4. In this manner, the solenoid 142 is energized by one state of the signal 144 to open the auxiliary contacts 10 and is deenergized by the other state of the signal 144 to close the auxiliary contacts 10. Preferably, the solenoid 142 includes a circuit (not shown) which responds to a change in state of the signal 144 to initiate a corresponding change in state of the moving solenoid plunger 143 between the open and closed positions thereof.

The trip solenoid actuator 132 is energizable by the SCR 130, from the AFD 116 and/or the GFD 118, to actuate the solenoid plunger 143 to open the auxiliary contacts 10 in response to arc faults and ground faults, respectively. In the exemplary embodiment, the trip solenoid 142 includes a magnetic latch (not shown) in which a stationary magnet holds the moving solenoid plunger 143 in the open position. Alternatively, a mechanical latch (not shown), which mechanically latches and holds the plunger 143 in the open position, or stationary magnet(s) in the coil of the trip solenoid 142, which magnetically holds the plunger 143 in the open and closed positions, is employed.

The exemplary remotely controlled circuit breaker 1 contains thermal/magnetic trip plus one or both of AFCI and/or GFCI trip functions. This allows the user to have thermal, magnetic, and AFCI and/or GFCI fault protection on the circuit breaker 1 with the ability to remotely open and close the auxiliary contacts 10. The AFCI and/or GFCI fault protection opens the auxiliary contacts 10 which are subject to remote control through the remote external signal 144 and, thus, allow the user to remotely reset the tripped circuit breaker 1 as caused by the arc fault and/or the ground fault.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker comprising:

first separable contacts;

means for opening said first separable contacts in response to predetermined current conditions;

second separable contacts in series with said first separable contacts;

means for operating said second separable contacts in response to a signal;

at least one of: (a) means for detecting a ground fault, and (b) means for detecting an arc fault; and actuator means, energizable by said at least one of said means for detecting a ground fault and said means for detecting an arc fault, for actuating said means for operating said second separable contacts to open said second separable contacts.

2. The circuit breaker of claim 1 wherein said first separable contacts are main separable contacts; and wherein said means for opening said first separable contacts in response to predetermined current conditions includes means for opening said first separable contacts when actuated, and means for actuating said means for opening said first separable contacts in response to predetermined current conditions.

3. The circuit breaker of claim 2 wherein said means for opening said first separable contacts is an operating mechanism; and wherein said means for actuating said means for opening said first separable contacts in response to predetermined current conditions is a trip mechanism.

4. The circuit breaker of claim 1 wherein said second separable contacts are auxiliary separable contacts.

5. The circuit breaker of claim 1 wherein said means for operating said second separable contacts includes:

means for operating said second separable contacts when actuated; and means for actuating said means for operating said second separable contacts when actuated in response to a signal.

6. The circuit breaker of claim 5 wherein said means for actuating said means for operating said second separable contacts is energized in response to said signal to open said second separable contacts.

7. The circuit breaker of claim 6 wherein said at least one of said means for detecting a ground fault and said means for detecting an arc fault energizes said actuator means to actuate said means for operating said second separable contacts to open said second separable contacts in response to at least one of said ground fault and said arc fault, respectively; and wherein said means for actuating said means for operating said second separable contacts is deenergized in response to said signal to close said second separable contacts.

8. The circuit breaker of claim 7 wherein said signal is an external signal which is originated remotely from said circuit breaker.

9. The circuit breaker of claim 5 wherein said means for actuating said means for operating said second separable contacts is a solenoid.

10. The circuit breaker of claim 5 wherein said actuator means is a solenoid means energizable by said at least one of said means for detecting a ground fault and said means for detecting an arc fault, said solenoid means for actuating said means for operating said second separable contacts to open said second separable contacts.

11. The circuit breaker of claim 5 wherein said at least one of said means for detecting a ground fault and said means for detecting an arc fault energizes said actuator means to actuate said means for operating said second separable contacts to open said second separable contacts in response to at least one of said ground fault and said arc fault, respectively.

12. The circuit breaker of claim 11 wherein said actuator means is a solenoid means for actuating said means for operating said second separable contacts.

13. The circuit breaker of claim 5 wherein said means for operating said second separable contacts includes a movable contact arm.

14. The circuit breaker of claim 1 wherein said at least one of said means for detecting a ground fault and said means for detecting an arc fault includes a ground fault trip circuit.

15. The circuit breaker of claim 1 wherein said at least one of said means for detecting a ground fault and said means for detecting an arc fault includes an arc fault trip circuit.

16. The circuit braker of claim 1 wherein said at least one of said means for detecting a ground fault and said means for detecting an arc fault includes a ground fault trip circuit and an arc fault trip circuit.

17. The circuit breaker of claim 1 wherein said circuit breaker is a single pole miniature circuit breaker.

\* \* \* \* \*